(12) United States Patent
Bhavnani et al.

(10) Patent No.: US 12,300,100 B2
(45) Date of Patent: May 13, 2025

(54) SYSTEM AND METHOD FOR PROVIDING A DIGITAL INTERSECTION

(71) Applicant: Miovision Technologies Incorporated, Kitchener (CA)

(72) Inventors: Jean-Pierre Bhavnani, Waterloo (CA); David G. Thompson, Waterloo (CA); Tyler R. W. Abbott, Kitchener (CA); Matthew M. Ignor, Stratford (CA); John E. Price, Kitchener (CA); Kurtis N. McBride, Kitchener (CA)

(73) Assignee: Miovision Technologies Incorporated, Kitchener (CA)

( * ) Notice: Subject to any disclaimer, the term of this patent is extended or adjusted under 35 U.S.C. 154(b) by 839 days.

(21) Appl. No.: 15/733,513

(22) PCT Filed: Feb. 21, 2019

(86) PCT No.: PCT/CA2019/050215
§ 371 (c)(1),
(2) Date: Aug. 17, 2020

(87) PCT Pub. No.: WO2019/161501
PCT Pub. Date: Aug. 29, 2019

(65) Prior Publication Data
US 2020/0388151 A1    Dec. 10, 2020

Related U.S. Application Data

(60) Provisional application No. 62/633,519, filed on Feb. 21, 2018.

(51) Int. Cl.
*G08G 1/08* (2006.01)
*G08G 1/01* (2006.01)
(Continued)

(52) U.S. Cl.
CPC .......... *G08G 1/081* (2013.01); *G08G 1/0112* (2013.01); *G08G 1/087* (2013.01); *H04W 4/44* (2018.02)

(58) Field of Classification Search
CPC ...... G08G 1/081; G08G 1/0112; G08G 1/087; G08G 1/0116; G08G 1/02; G08G 1/04;
(Continued)

(56) References Cited

U.S. PATENT DOCUMENTS

2006/0092043 A1* 5/2006 Lagassey ............. G07C 5/0891
340/907
2006/0095199 A1* 5/2006 Lagassey ................ H04L 65/61
340/933
(Continued)

FOREIGN PATENT DOCUMENTS

EP    1830332 A2    9/2007
EP    3029652 A1    6/2016
(Continued)

OTHER PUBLICATIONS

Supplemental European Search Report issued in corresponding EP application No. 19758007.9; search completed Aug. 31, 2021.
(Continued)

*Primary Examiner* — Tyler J Lee
(74) *Attorney, Agent, or Firm* — CPST Intellectual Property Inc.; Brett J. Slaney

(57) ABSTRACT

There is provided a digital intersection system. The system can include at least one safety-critical device corresponding to a device controlling allowable movements into or through the intersection. The system can also include a local control unit configured to generate and output an intersection state plan, and a safety control unit configured to accept the intersection state plan from the local control unit, validate the state plan, and provide the state plan to any interested
(Continued)

device in the intersection, the any interested device comprising the at least one safety-critical device. The system can optionally include at least one sensor corresponding to a device or data source capable of collecting information related to the intersection or local area surrounding the intersection, or impacting traffic patterns at an intersection, wherein the local control unit is further configured to accept inputs from the at least one sensor.

23 Claims, 13 Drawing Sheets

(51) Int. Cl.
*G08G 1/081* (2006.01)
*G08G 1/087* (2006.01)
*H04W 4/44* (2018.01)

(58) Field of Classification Search
CPC ........ G08G 1/042; G08G 1/097; G08G 1/095; H04W 4/44; H04L 9/00; H04L 12/66
See application file for complete search history.

(56) References Cited

U.S. PATENT DOCUMENTS

| | | |
|---|---|---|
| 2010/0325720 A1 | 12/2010 | Etchegoyen |
| 2016/0027300 A1* | 1/2016 | Raamot ................ G08G 1/0145 340/922 |
| 2016/0155334 A1* | 6/2016 | Jansson .................... G08G 1/07 340/906 |
| 2016/0247400 A1* | 8/2016 | Nguyen ................ H04L 67/125 |
| 2016/0247401 A1 | 8/2016 | Nguyen et al. |
| 2016/0351048 A1* | 12/2016 | Thompson ............. G08G 1/081 |
| 2018/0158328 A1* | 6/2018 | Benhammou ............ G08G 1/04 |
| 2018/0174449 A1* | 6/2018 | Nguyen ............... G08G 1/0104 |

FOREIGN PATENT DOCUMENTS

| | | |
|---|---|---|
| GB | 2003638 A | 3/1979 |
| WO | 2015185009 A1 | 12/2015 |

OTHER PUBLICATIONS

International Search Report issued in corresponding PCT Application No. PCT/CA2019/050215; search completed May 30, 2019.

* cited by examiner

SYSTEM AND METHOD FOR PROVIDING A DIGITAL INTERSECTION

CROSS-REFERENCE TO RELATED APPLICATION(S)

This application is a National Entry of PCT Application No. PCT/CA2019/050215, filed on Feb. 21, 2019, which claims priority to United States Provisional Patent Application No. 62/633,519 filed on Feb. 21, 2018. The entire contents of the aforementioned applications are incorporated herein by reference as if set forth in their entirety.

TECHNICAL FIELD

The following relates to systems and methods for providing a digital intersection.

BACKGROUND

Standard roadway intersections are typically composed of a traffic cabinet, multi-use signal heads, and sensors within and around the intersection for pedestrian, vehicle, emergency vehicle and other users of the roadway. Various standards inclusive of the NEMA TS 1-1989 R2005, NEMA TS2-2016, TEES 2009, and ITS Cabinet v01.02.17b, all define the cabinet in terms of traffic signal controllers, detector racks, load switches driving the signals heads, and monitor units, with most standards being non-interchangeable and varying terminology differentiating the detailed functionality defined by each standard.

In each case the traffic signal control unit is responsible for setting the allowable movements based on the detector inputs and often time-varying traffic demand, the detector racks serve as the interface for sensors in the intersection, and the monitor unit checks the safe operation of the cabinet and signal heads. In many cases the monitor unit confirms the functioning of the traffic control unit, confirms the functioning of power supplies within the cabinet, and checks for conflicting active signal head states as defined by a technician during intersection install.

Current standards-based intersections are found to suffer from several limitations. Common to all are the inherent costs of installation, maintenance and operation due to the physical layouts imposed, limited extensibility to new devices, the ability to diagnose failures, and the inability to adopt new technologies and manufacturing techniques.

In all standards, sensors and signal heads drive or are driven by direct connections to the traffic cabinet. Each of the direct connections from the traffic cabinet is routed within the intersection either above or below ground through conduit requiring extensive trenching. Often when additional sensors or signal heads are added, or maintenance is required to existing sensors or signal heads, re-trenching is required to address collapsed or inadequate conduit.

Current standard-based intersections also suffer from limitations on the number of sensors and signal heads that an intersection can have, and are found to significantly limit the scope of, safety critical devices within the intersection. Furthermore, remote diagnoses of intersection failures are often impeded as devices within and without the cabinet are not inherently addressable for retrieval of diagnostic information and logs. In other words, the intersection as currently designed and implemented does not inherently support remote communications.

The strict functional demarcation of each physical device within the intersection limits the ability of traffic component manufacturers from adopting new technologies and manufacturing techniques as they become available or the combination of functions into new physical devices that either lower cost, simplify design or extend capabilities of the intersection.

It is an object of the following to address at least one of the above-noted disadvantages.

SUMMARY

In one aspect, there is provided a digital intersection system, comprising: at least one safety-critical device corresponding to a device controlling allowable movements into or through the intersection; a local control unit configured to generate and output an intersection state plan; and a safety control unit configured to accept the intersection state plan from the local control unit, validate the state plan, and provide the state plan to any interested device in the intersection, the any interested device comprising the at least one safety-critical device.

In an implementation, the system can further comprise at least one sensor corresponding to a device or data source capable of collecting information related to the intersection or local area surrounding the intersection, or impacting traffic patterns at an intersection, wherein the local control unit is further configured to accept inputs from the at least one sensor.

In another aspect, there is provided a method for implementing an intersection state change using a digital intersection system, the method comprising: receiving at a local control unit, sensor data from one or more sensors in the intersection, each sensor corresponding to a device or data source capable of collecting information related to the intersection or local area surrounding the intersection, or impacting traffic patterns at an intersection; and outputting, by the local control unit, a state plan, and sending the state plan to a safety control unit configured to accept the intersection state plan from the local control unit, validate the state plan, and provide the state plan to any interested device in the intersection, the any interested device comprising at least one safety-critical device corresponding to a device controlling allowable movements into or through the intersection.

In yet another aspect, there is provided a method of processing intersection state plans, the method comprising: receiving, at a safety control unit, a state plan provided to the safety control unit by a local control unit, the safety control unit configured to accept the intersection state plan from the local control unit, validate the state plan, and provide the state plan to any interested device in the intersection, the any interested device comprising a at least one safety-critical device corresponding to a device controlling allowable movements into or through the intersection; determining at the safety control unit if the state plan is safe; when the state plan is not safe, the safety control unit initiating an intersection fault to cause the intersection to enter an intersection fault mode; and when the state plan is determined to be safe, the safety control unit approving the state plan and publishing the state plan as a next state.

In yet another aspect, there is provided a method of processing failure modes in a digital intersection system, the method comprising: determining that a safety critical device is in fault, the safety critical device corresponding to a device controlling allowable movements into or through the intersection; determining if the safety critical device in fault is functional; when the safety critical device is functional, changing a local state to a local fault state; when the safety critical device is not functional, the fault being detected by a safety control unit in the digital intersection, the safety control unit configured to accept the intersection state plan from the local control unit, validate the state plan, and provide the state plan to any interested device in the intersection; and the safety control unit entering an intersection fault state and notifying the any interested device in the intersection of the intersection fault, to cause the intersection to enter into an intersection fault mode, wherein the notified devices enter the intersection fault state.

In yet another aspect, there is provided a method of configuring a local control unit configured to generate and output an intersection state plan in a digital intersection system, the method comprising: establishing secure communications between all devices in the digital intersection; registering the devices and at least one sensor with the local control unit; registering the local control unit with a safety control unit, once the safety control unit is in a ready state and has been configured with an initial safety table, wherein the safety control unit is reconfigured to include the local control unit; registering an intersection gateway with the local control unit, the intersection gateway in communication with the local control unit to permit the local control unit to communicate with a communication network; and operating the local control unit to generate and output an intersection state plan, to have the safety critical device accept the intersection state plan, validate the state plan, and provide the state plan to any interested device in the intersection, the any interested device comprising the at least one safety-critical device.

In yet another aspect, there is provided a method of processing a new or revised safety table in a digital intersection, the method comprising: after a new safety critical device is added to the digital intersection or a configuration changes, a safety control unit determining whether a new device is being added or an existing device is to be updated; for a new device being added, augmenting an existing state vector to generate a new state vector that includes the new device; for an existing device, updating the existing state vector with one or more mode changes; publishing a new safety table to a local control unit with an associated table identifier to enable the local control unit to send the new safety table with a next intersection state; and receiving an acknowledgement of the new safety table from the local control unit and beginning to utilize the new safety table at the safety control unit.

In other aspects, computer readable media comprising computer executable instructions for performing the methods can also be implemented.

BRIEF DESCRIPTION OF THE DRAWINGS

Embodiments will now be described with reference to the appended drawings wherein.

DETAILED DESCRIPTION

The following provides a redesign of traditional intersection infrastructure that uses digital, addressable, connected components. This enables organizations to provide parity or enhanced functionality and improved total cost of ownership over traditional architectures. The following also provides an extensible platform that can allow 3rd parties to develop devices (e.g., extensions of sensors, safety-critical devices, ACUs and LCUs (see below)) or applications that act as inputs or outputs that seamlessly communicate and interact at the intersection without necessarily requiring the core cabinet hardware. Moreover, devices and applications can be built using the inputs/outputs of existing devices in the intersection but provide additional or improved capabilities. That is, both entirely new intersections can be built using the systems and methods described below, or implementations that mix both legacy and new infrastructure, with third parties being able to build on top of the platform described below.

As such, traffic intersections can be more easily integrated into internet-connected infrastructure, such as autonomous traffic systems and smart cities, while providing safety equivalence to current physical malfunction management unit (MMU) devices. The extensible design can provide security, safety, and functionality that is extended to non-core devices providing additional functionality to the intersection.

Figure 1:
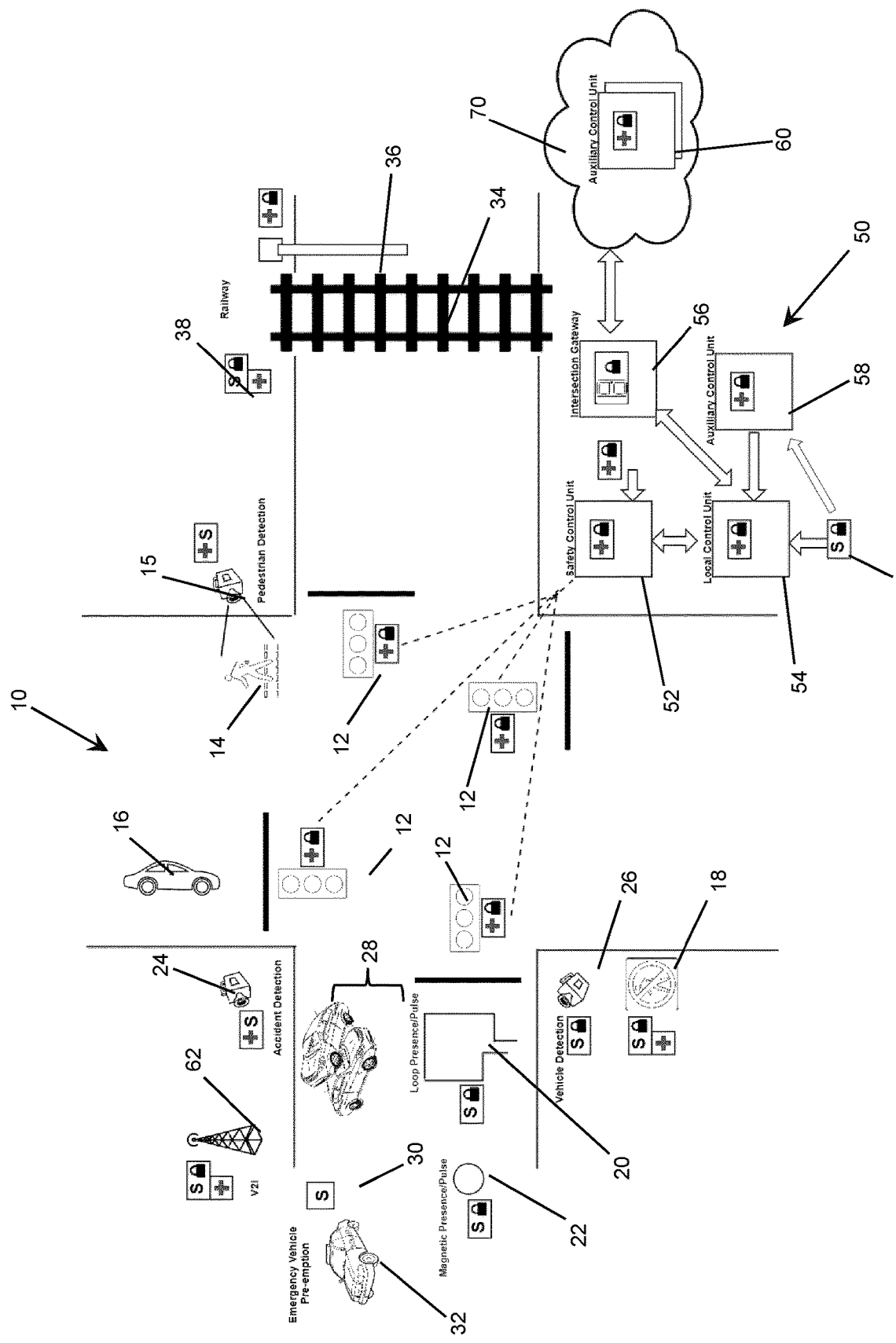
FIG. 1 is a schematic diagram of a traffic intersection enabled for digital control and communications.

Turning now to the figures, FIG. 1 provides a schematic illustration of a traffic intersection 10 at which a pair of roadways cross each other. It can be appreciated that the intersection 10 shown in FIG. 1 is only one example, and the principles discussed herein can equally be adapted to other types of intersections or occurrences of traffic flow devices, for example, staged entry to an on-ramp, roundabouts, etc. In this example, the intersection 10 includes a signal head 12 at each corner. Each signal head 12 includes a set of traffic lights for controlling traffic in one or more directions. For example, a typical signal head 12 may include red, yellow and green lights, and additionally a directional light for controlling a turn signal. In addition to controlling vehicle traffic, e.g., to control movement of a vehicle 16 through the intersection 10, pedestrians 14 in many intersections 10 are provided with crosswalks or otherwise given signal controls 18 for making a crossing at the intersection 10. In this example, a pedestrian detection device 15 is also provided at the intersection 10, enable, for example, the intersection 10 to be aware of potential safety conflicts between vehicles and pedestrians.

The intersection 10 also includes a number of sensors (identified by "S" in FIG. 1) that may include additional hardware or other components to detect a vehicle or pedestrian, acquire data, report or communicate data, etc. For ease of illustration, FIG. 1 uses symbols to refer to example capabilities of the devices and components shown. In this example, a cross or "+" represents a safety-related or safety-critical device, and a "padlock icon" represents a secure or secured device. Secure modules can be used by certain components that allow devices within the intersection 10 to communicate (e.g., in one implementation the system can operate secure modules on OSI layers 5 and 6). Devices external to the intersection 10 may also have a secure module to communicate with the devices within the intersection 10. Herein, devices with a secure module can be considered "secure". It can be appreciated that, as seen in FIG. 1, the devices and components shown can include sensor, safety, and security capabilities, or any combination of these capabilities.

In this example, an inductive loop presence/pulse device 20 is embedded in the roadway at one approach to the intersection 10, for detecting the presence or passage of a vehicle 16. Also shown at that approach to the intersection 10 is a magnetic presence/pulse detector 22 embedded in the roadway. In another example shown in FIG. 1, an accident detection device 24 for detecting a collision or other vehicular accident 28, a vehicle detection device 26 for detecting the presence or passage of vehicles 16, and an emergency vehicle pre-emption sensor 30 to allow emergency vehicles 32 to pre-empt a light signal, are shown. A vehicle to infrastructure (V2I) access point 62 is also shown, which allows vehicles 16 to communicate with one or more networks of connected devices and entities, such as a traffic network. V2I components are increasingly becoming core components of smart cities that enable vehicles to communicate with infrastructure. It can be appreciated that depending on the application of V2I, such components may be considered safety critical.

For the sake of illustration, FIG. 1 also includes a rail crossing 34 and barrier 36, which can also include one or more rail sensors 38 to detect the approach of a rail vehicle to operate the barrier 36 in this example. As such, it can be appreciated that the intersection 10 can include a multitude of sensors, devices, and equipment to not only control flow through the intersection 10 but to also acquire information from entities within or near the intersection 10, as well as beyond the intersection 10.

To enhance the communication capabilities, extensibility, and interoperability at the intersection 10, a digital intersection system 50 is provided. The system 50 is illustrated as a collection of modules, described below, that may be implemented using software, hardware, combinations of software and hardware, and can be deployed in or near the intersection 10 in any suitable physical configuration. An example implementation of such a suitable configuration is described later, making reference to FIGS. 6 and 7.

The system 50 includes a safety control unit (SCU) 52, a local control unit (LCU) 54, an intersection gateway (IG) 56, and optional auxiliary control units (ACUs) 58 deployed at the intersection 10. Various additional sensors 64 can provide data to the system 50 via the LCU 54, and the IG 56 can allow the system 50 to communicate externally to the intersection 10 by having access to a network 70 within which an external ACU 60 is deployed. It can be appreciated that the term "external ACU 60" is used only to refer to an ACU 60 that is located remote from the particular intersection 10 being examined, and may itself be a local ACU 54 in another intersection (e.g., within a wider traffic network).

The ACU 58 is a device (e.g. having a software application executing thereon) that is configured to take input(s) from sensor devices and output control instruction(s) to the LCU 54. That is, any of the sensors at the intersection (identified by S) can communicate with the ACU 58. As indicated above, an ACU 58, 60 may be either remote (60) or local (58) to the intersection 10. An intersection 10 may have a plurality of ACUs 58.

The LCU 54 accepts inputs from sensor devices (S) and the ACU(s) 58 and outputs an intersection state plan I'(t) to the SCU 52. In this configuration, an intersection 10 includes a single LCU 54.

The SCU 52 is a module that takes an intersection state plan I'(t) from the LCU 54, validates the state plan, and publishes the state plan to any interested device in the intersection 10, which can include flow control devices. A flow control device, refers to any device that affects the allowable movement of pedestrians, vehicles or other entities within the intersection 10, with security being provided by secure modules (S). Flow control devices can include, for example, signal heads 12, V2I units 62, pedestrian signals 18, railway safety barriers 36, and others as discussed above.

The IG 56 can be implemented using a router or equivalent communication device or node. In this example, the IG 56 is embodied as a router operating at OSI layers 4, 5, and 6 to provide a gateway to devices that are external to the intersection 10. An IG 56 or separate secure module can optionally provide protection through anomaly and intrusion detection and is a secure device within the intersection 10. The IG 56 can be embodied as a smart router capable entity that allows devices external to the intersection 10 to communicate with devices internal to the intersection 10. An intersection 10 may have a plurality of IGs 56.

A sensor (S) is any device or data source that may collect information related to the intersection 10 or local area surrounding the intersection 10, or device/data sources that may impact traffic patterns (locally or remotely). That is, the digital intersection described herein can be used as a "conduit" for sensor data that may or may not relate to traffic data, or that is only loosely coupled to the traffic data (e.g. in a smart city implementation). For example, ambient noise level measurements can be acquired by the digital intersection. Moreover, a number of digital intersections can act as a series of geographically distributed data conduits throughout a city, region, country, etc. Examples of sensors in the intersections are inductive loop detectors, magnetic sensors, video image processors, microwave radar sensors, infrared sensors, laser radar sensors, crowdsourced data, wireless device sensors, vehicle to vehicle (V2V) and V2I, pedestrian push buttons and sensors, Emergency Vehicle Pre-emption (EVP) sensors, Transit Signal Prioritization (TSP) sensors, weather forecasting data, network congestion forecasting data, railway sensors, etc. Some of these types of sensors are shown by way of example in FIG. 1 and introduced above.

Due to the nature of the intersection 10, particularly in that vehicles, pedestrians and other objects flow through and across one or more roadway (which may also have flowing vehicles, pedestrians, etc.), certain devices in the intersection 10 may be considered "safety critical". This safety critical designation may be given to any device/unit/component on the network that has the potential of introducing a safety risk to vehicles, bikes, pedestrians, etc., or the infrastructure itself. This potential may be seen as a movement flow conflict where two actors' paths in the intersection conflict at the same time. Other ways in which this risk may be encountered are through the failure to signal a specific movement, or supplying erroneous data to another node on the network. A safety critical device in fault may go into intersection fault when instructed to do so. It may also have a way of actuating an intersection fault mode, for example flashing red.

Safety critical components include, but are not limited to: flow control devices, the SCU 52, the LCU 54, and ACUs 58—when sensor output is required for safety critical input to the LCU 54.

Accordingly, in the configuration shown in FIG. 1, addressable intersection components are provided, that allow for message-based communications within a private secured network. As discussed below, this network can be divided by subnets in some implementations. The architecture also allows for anomaly detection (logging and diagnostics), as well as message brokering.

Moreover, the external connectivity provided by the IG 56 allows for secured internet connectivity for additional functionality and access to cloud-computing capabilities. For example, intersection monitoring, remote management (manual or automated re-configuration of intersection state logic and timing plans), adaptive signal control (real time updates), and intersection operating mode changes (e.g. put into emergency response mode, activating pre-emption, etc.). The external connectivity also provides tolerance for external connectivity disruptions. For example, by providing redundancy in a network (wired, wireless, disconnected operation modes).

The internal network of devices communicating state can be assumed to be insecure and therefore all messages can be digitally signed to prove the identity of the message originator and content integrity. A layer of encryption may also be applied to the network if desired. An optional intrusion detection system can be used to listen to network messages and identify and alert on failed digital signatures. For anomaly detection, machine learning can be used to identify anomalies in communication patterns to identify malfunctions or abnormal operating conditions.

It can be appreciated that physical components may be connected by wire or wirelessly. The proposed security mechanisms are intended to suffice for both wired/wireless communications.

For communications, certain messages can be utilized, for example, generalized failure, specific failures, diagnostics or status messages, intersection validation messages, control messages, and input messages. Here, control messages can refer generally to any ACU->LCU, LCU->SCU or SCU->flow control messages.

Some specific failures can include: sensor reporting or detected failure (e.g. detector stuck on), flow control device reporting or detected failure (e.g. signal head has failed), identification of invalid control instruction detected, and connectivity failure.

Control messages can include any message intended to manage flow within the intersection, and input messages can include, for example, local sensors indicating intersection state or events, pre-emption messages, or remote sensors 64 indicating influences on the intersection 10.

As will be explained in greater detail below, the intersection 10 can assume certain operating modes, for example, normal, intersection fault, and diagnostics. The normal mode is where the system uses programmed signal control algorithms and responds to inputs to adjust timing or intersection state. Intersection fault occurs when an intersection 10 has encountered a failure that impairs intersection function. The system returns to normal operating mode if the failure is automatically recoverable. Recovery may require external intervention at which time the system returns to normal operation.

Figure 2:
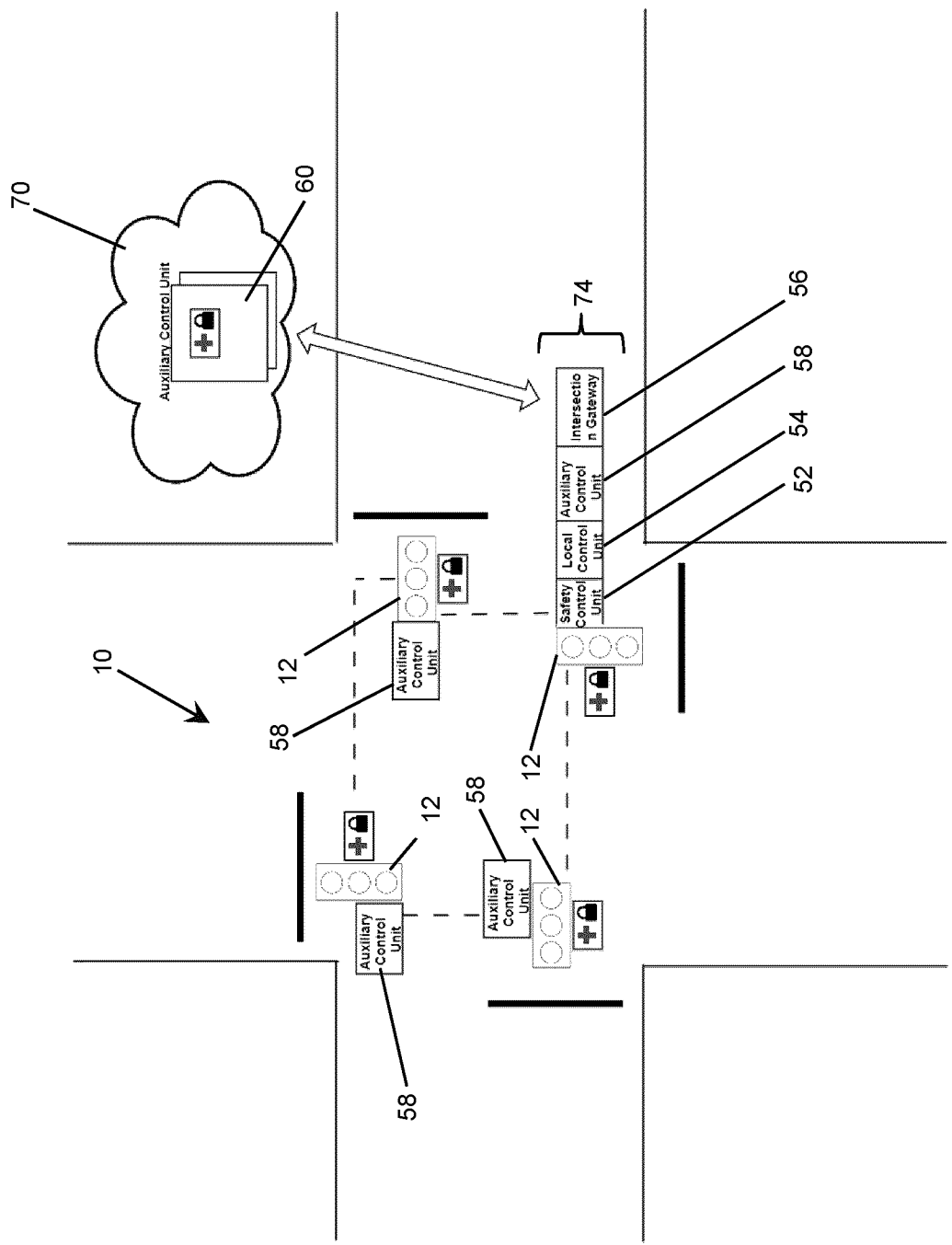
FIG. 2 is a schematic diagram of an implementation for deploying a digital intersection system.

Turning now to FIG. 2, one example of a configuration for the system 50 at a particular intersection 10 is shown. In this example, the SCU 52, LCU 54, a local ACU 58, and the IG 56 are grouped together in a particular physical device, cabinet, or other structure at one of the signal heads 12, with the other signal heads 12 having their own ACUs 58 that communicate with the SCU 52 at the "main" signal head 12. The ACUs 58 can also communicate with each other. It can be appreciated that since the SCU 52, LCU 54 and ACUs 58 may be embodied as software entities (e.g. modules, services, or libraries), they can be grouped together in different physical configurations. For example, more than one signal head 12 can include an SCU 52, LCU 54 and ACU 58, with only one of the SCUs 52 and one of the LCUs 54 being active in a given intersection 10. Therefore, the grouping shown in FIG. 2 can be implemented within the signal head itself without necessarily requiring a separate cabinet or other structure. In another example, the system 50 may be deployed in a manner that appears like a traditional intersection with a cabinet containing physically distinct devices, but with SCU 52, LCU 54, and ACU 58 functionality.

Figure 3:
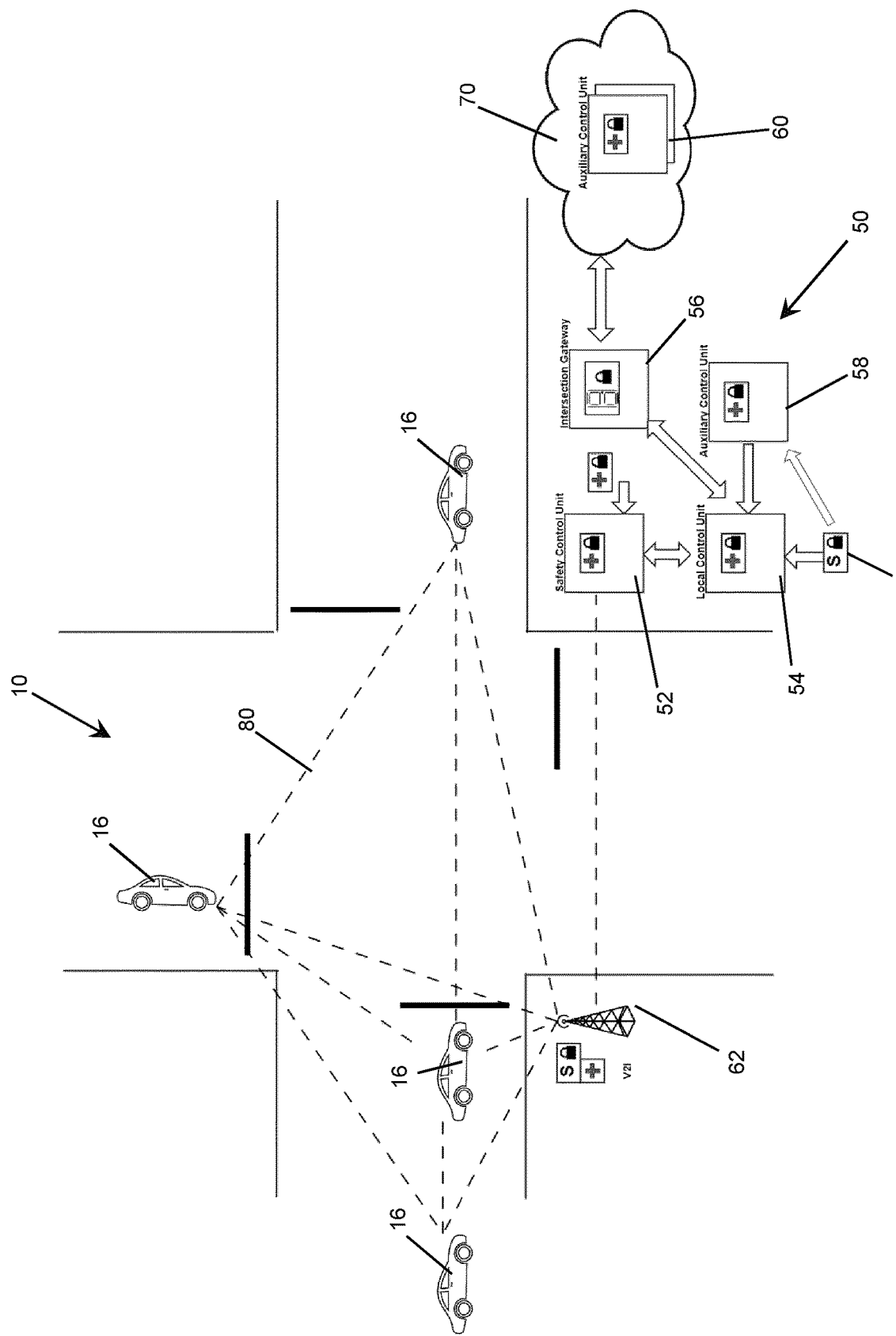
FIG. 3 is a schematic diagram of a traffic intersection without signal heads, enabled for digital control and communications.

As shown in FIG. 3, an intersection 10 can also be implemented in which no signal heads 12 are required, e.g., in an autonomous or semi-autonomous traffic network wherein vehicles 16 communicate directly with the system 50, via a V2I access point 62 and/or with each other. In the absence of signal heads 12, the components of the system 50 can be housed in any available enclosure, cabinet or other structure. In this example, the need for signal heads 12 is removed due to the autonomous nature of the vehicles 16 and therefore FIG. 3 shows a non-traditional "intersection". As such, the digital intersection described herein can be employed in traditional intersections 10 that employ signal heads 12 and the like, as well as future looking intersections that may utilize different infrastructure or not require certain traditional infrastructure. It can be appreciated that in some future intersections where traditional infrastructure is not required, the entities described herein (e.g. SCU 52, LCU 54 and ACU 58) may be physically remote from the intersection, and/or virtualized.

Figure 4:
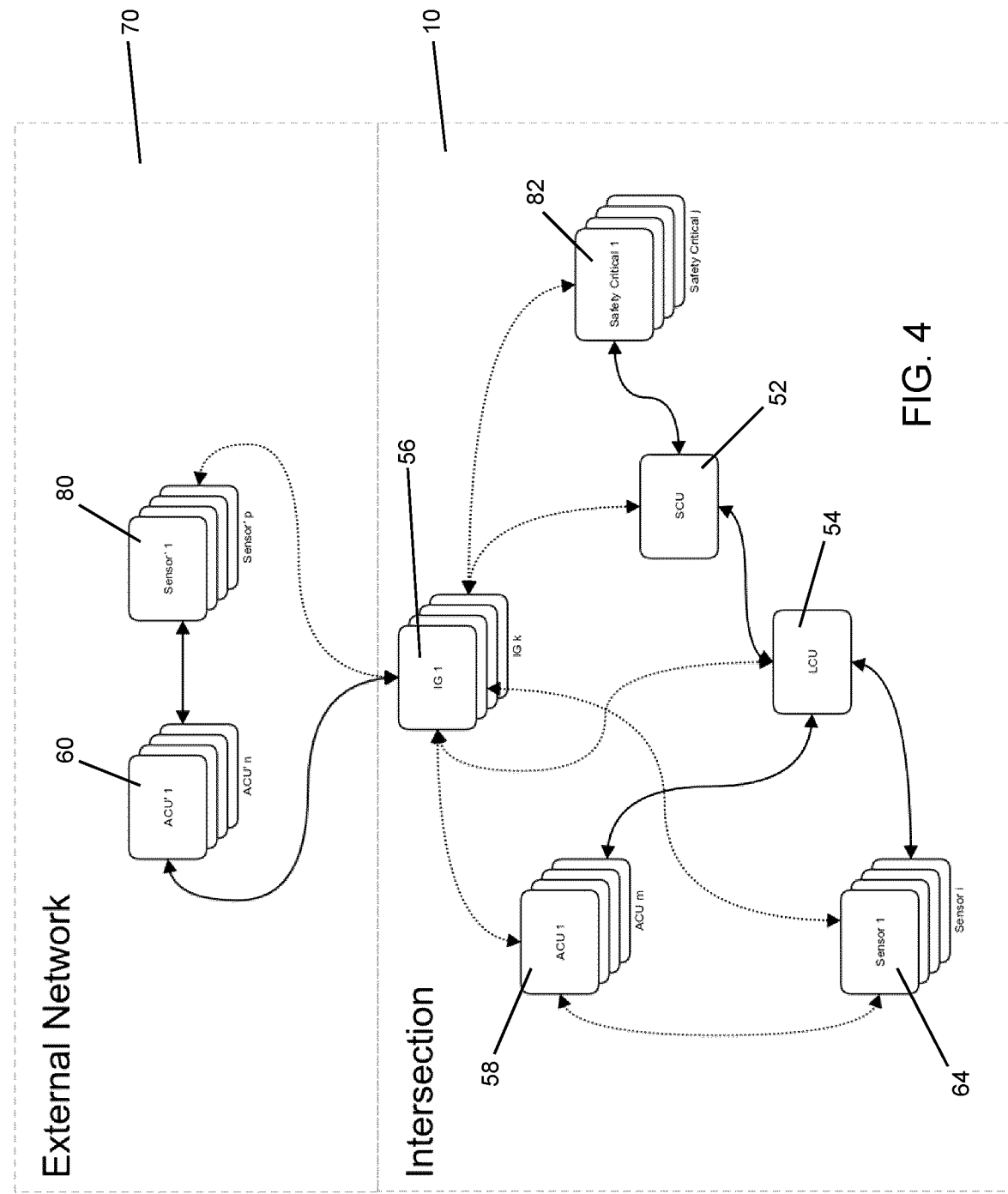
FIG. 4 is a flow diagram illustrating communication paths within an intersection network and an external network.

The flow diagram shown in FIG. 4 illustrates the role of the IG 56 between the intersection 10 and the external network 70. In FIG. 4 it can be appreciated that solid lines represent paths of communication for operation of the intersection, while the dotted lines indicate optional communication paths. From the external network 70, the IG 56 receives data from ACUs 60 and sensors 80. Within the intersection 10 the IG 56 can communicate with the ACUs 58, LCU 54, SCU 52, as well as the various sensors 64 and flow control devices 82. The data being exchanged can include control or programming instructions to the LCU in, for example, the application layer. The protocols and contents of the messages will typically depend on the specific traffic control application running within the intersection 10. Within an adaptive control system, the messages could be actors vying for traffic resources, or network-level instructions. In a standard traditional semi-actuated network, the messages may be instructions on offsets or traffic plans to be utilized, or even new traffic timing plans. The messages can also in some cases correspond to an identity transformation applied to messages from non-local upstream or downstream sensors.

Figure 5:
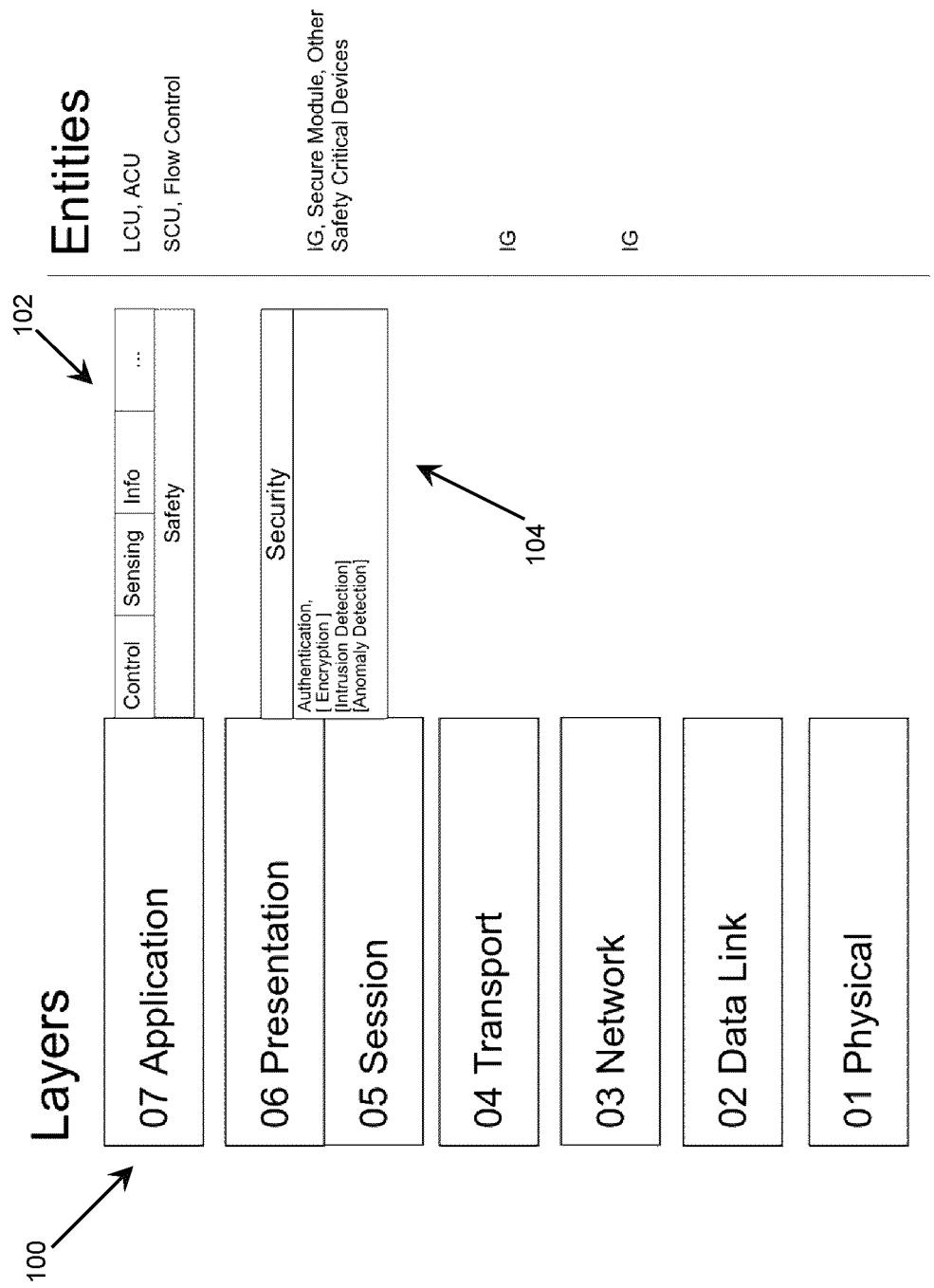
FIG. 5 is a schematic diagram of OSI layers with corresponding entities from the digital intersection system.

In one non-limiting example, the digital intersection system 50 can be deployed on a standard OSI stack 100 as shown in FIG. 5, with four of the OSI layers being utilized. At the physical layer (01) sits the physical modules and general topology of the intersection and connectivity amongst the modules. At the communication layers (02, 03, 04), the communication protocols amongst the modules are defined. As the security layers (05, 06), the security mechanisms built into the digital intersection system 50 that apply to the internal and external modules. At the application/logic layer (07) are the fundamental base controller logic, safety logic, state and timing configurations, input/output handling, and specific application cases such as V2I, remote management, pre-emption, etc.

The entities associated with these layers are also shown in FIG. 5. For instance, the IG 56 operates at the security layer (05, 06), the transport layer (04), and the network layer (03). The LCU 54, SCU 52, ACU 56 and the flow control devices 82 operate at the application layer (07) and correspond to the devices/entities/modules that are responsible for control, sensing, information, and safety-related aspects. The secure modules are also part of the security layers (05, 06) and perform security-related functionality such as authentication, encryption, intrusion detection, anomaly detection, etc.

Figure 6:
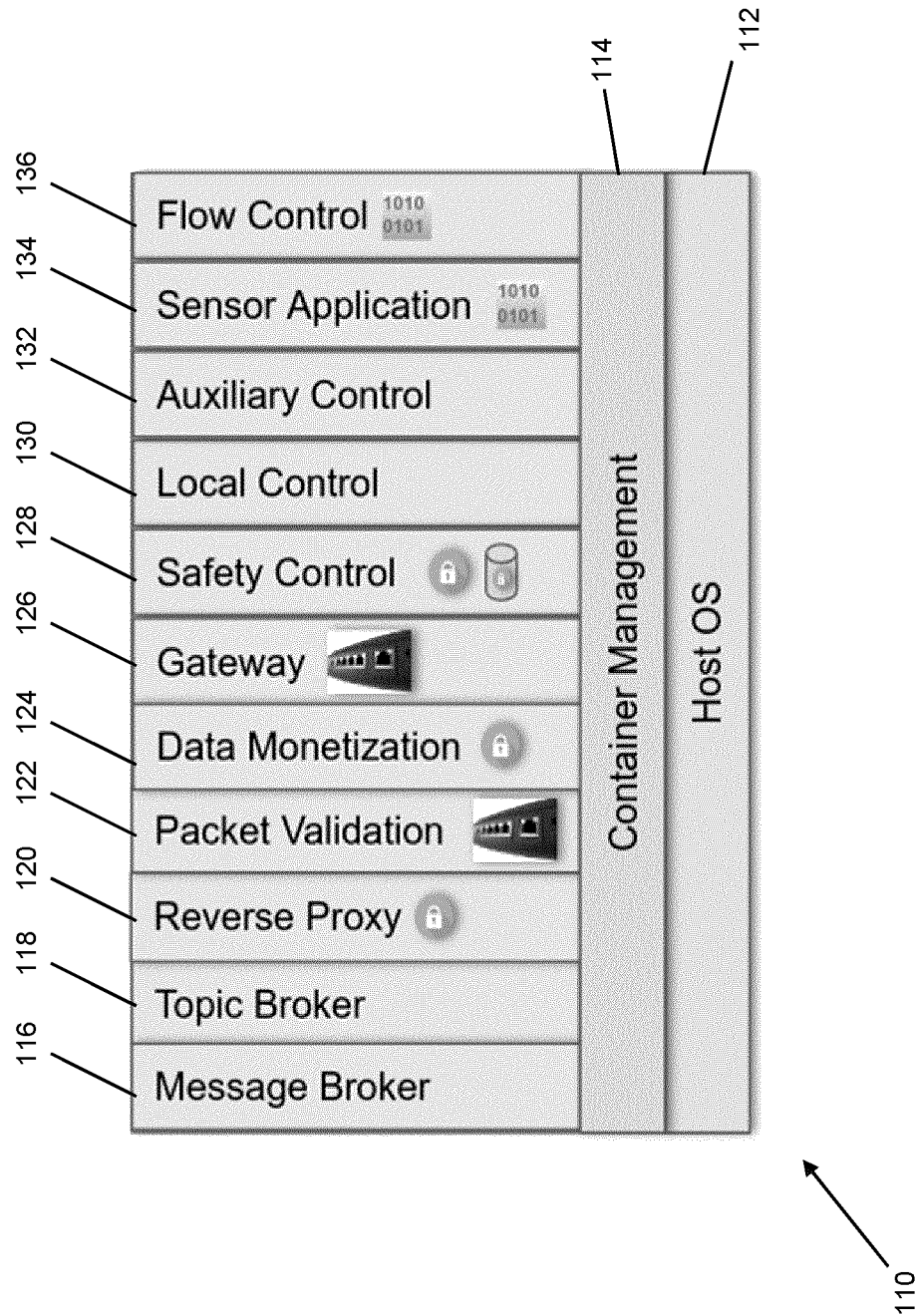
FIG. 6 is a schematic block diagram of an example of a set of application stacks running on a digital intersection primary core.
Figure 7:
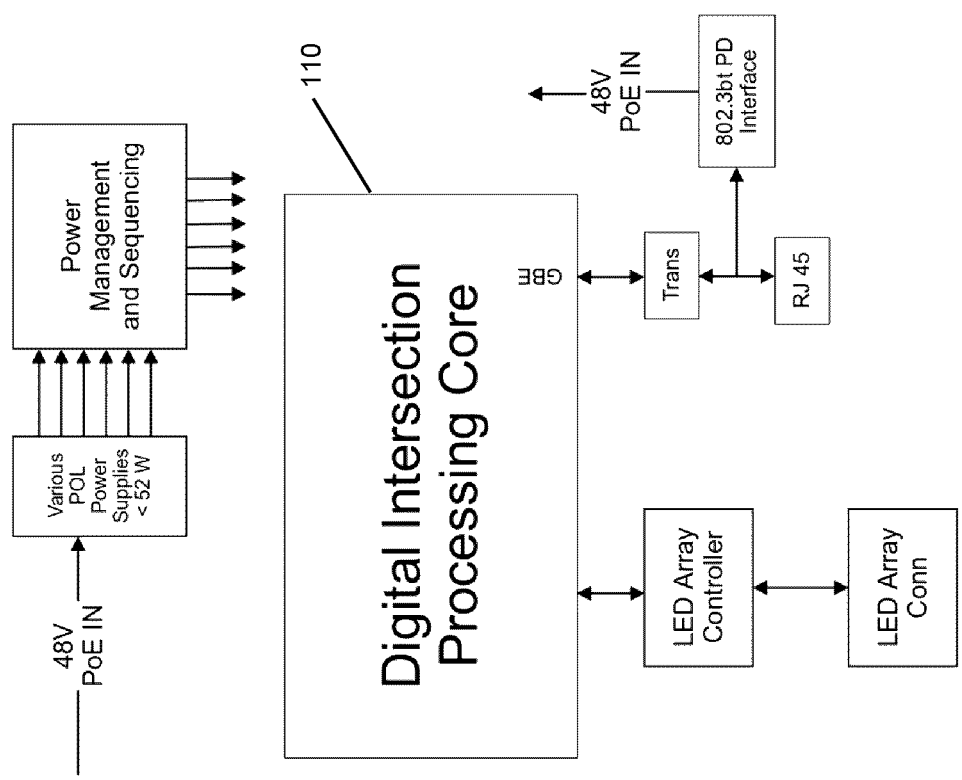
FIG. 7 is a schematic block diagram of a digital intersection primary core integrated with a vehicular signal head.

FIGS. 6 and 7 illustrate an example of an implementation for devices in the intersection 10. In this implementation, a digital intersection primary core (DIPC) 110 is utilized, which includes a predetermined processing specification (e.g., minimum) for the microprocessors, memory, storage and supporting peripherals used to run the digital intersection stack. It can be appreciated that the DIPC 110 can be implemented as a system-on-chip, module, PCB subsystem, etc. The DIPC 110 in this example includes the following predetermined specifications: processing architecture, time, memory, storage, power, cryptographic accelerator, I/Os, and optional subsystems.

The purpose of the predetermined requirements is to support an application stack such as the one shown in FIG. 6. Each stack can run in its own container isolated with hardware permissions provided by a container management system 114 running in a host operating system (OS) 112. In this example, the core stack includes a message broker 116, which is a messaging system for inter-stack communication; a topic broker 118, which is a publication/subscription system for inter-stack communication; a reverse proxy 120, which is responsible for authentication management and load-balancing; and a data monetization module 122, which is responsible for data access control and monetization. The stack can also include a gateway application 126, safety control application 128, local control application 130, auxiliary control application 132, sensor application 134, and flow control application 136 for the various devices in the intersection 10.

It can be appreciated that safety critical devices may pose additional requirements. For example, such safety critical devices may require a minimum of cryptographic support for authoring and authentication validation as well as data isolation for secure keys. Tamper resistance and resilience to side-channel attacks can also be included.

Figure 8:
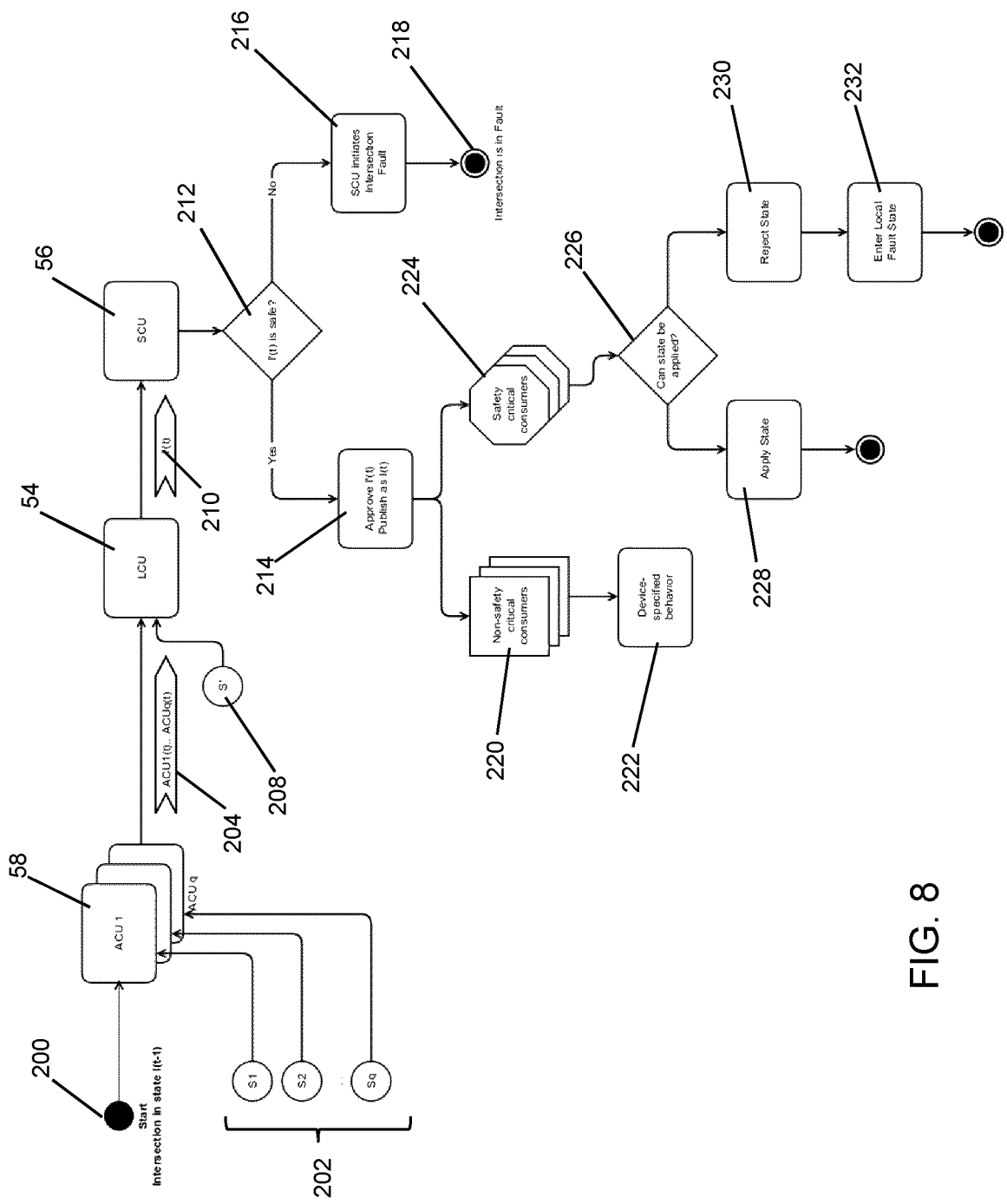
FIG. 8 is a flow diagram for intersection state changes.

An intersection state change encompasses any change to the allowed movements of either a pedestrian, a vehicle, or other. Turning now to FIG. 8, a flow diagram for such intersection state changes is shown. At 200 the flow logic starts with the intersection in state I(t−1). The ACU(s) 58 receive sensor data from sets of sensors, denoted by S1, S2 . . . Sq at 202. The ACU(s) 58 output control instructions (ACU1(t), ACU2(t) . . . ACUq(t)) to the LCU 54. The LCU 54 can also receive sensor data from the sensor set denoted by S', at 208. The LCU 54 outputs an intersection state plan I'(t) and provides the state plan to the SCU 52.

The SCU 52 determines at 212 if the state plan I'(t) is safe. If not, the SCU 52 initiates an intersection fault at 214, which causes the intersection to enter intersection fault mode at 218. For example, the signal heads 12 can be put into "flash" which has the effect of flashing the red lights on all signal heads 12. It can be appreciated that flash itself is not a failure mode of an intersection 10, but is a typical 'state' of the intersection 10 as the result of entering an intersection fault mode. If on the other hand, the state plan I'(t) is determined to be safe, the SCU 56 approves the state plan at 214 and publishes it as the current/next state I(t). I(t) is published to both non-safety critical consumers at 220 to influence device specified behaviour at 222, and to safety critical consumers at 224. The safety critical consumers determine at 226 whether or not the state I(t) can be applied. If so, the state is applied at 228. If not, the state is rejected at 230 and a local fault state can be initiated at 232. It can be appreciated that a local fault state corresponds to a device failure, e.g., a burnt bulb. A few examples of a local fault state include: a) the intersection state I(t) is received by the safety critical device and cannot be applied because the device is encountering a physical failure, or b) the intersection state I(t) is received by the device but the device is instructed to go into an unknown state, or c) the intersection state I(t) is received by the device but the device is not configured.

Figure 9:
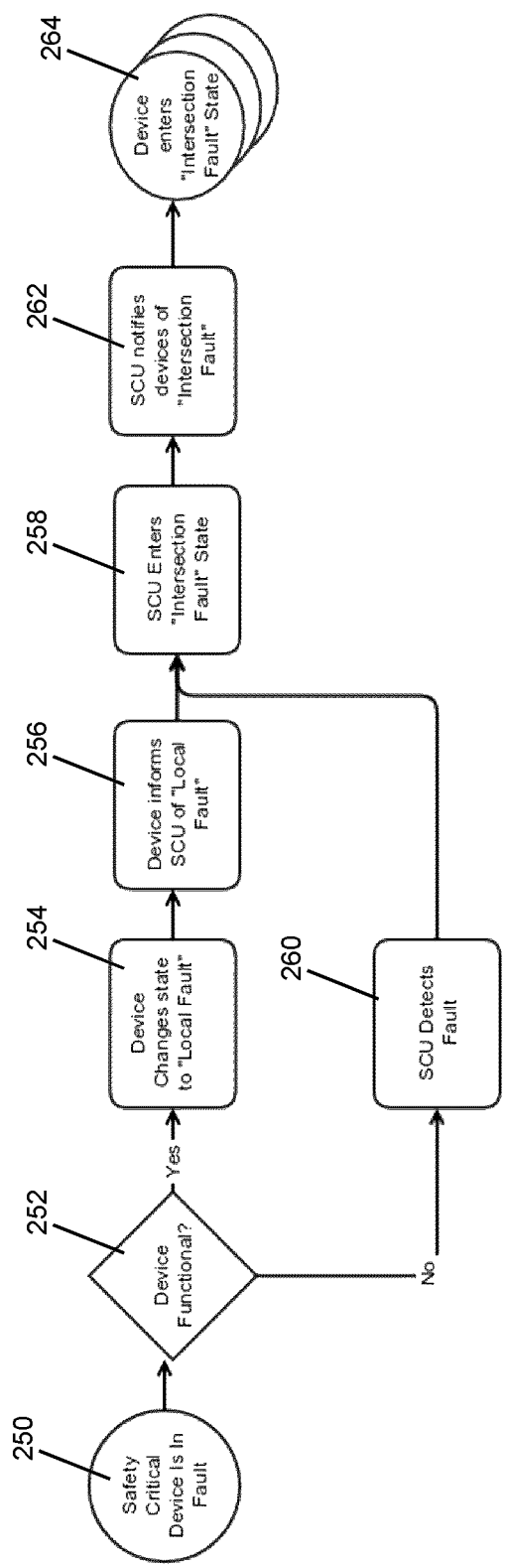
FIG. 9 is a flow diagram for one intersection fault mode.
Figure 10:
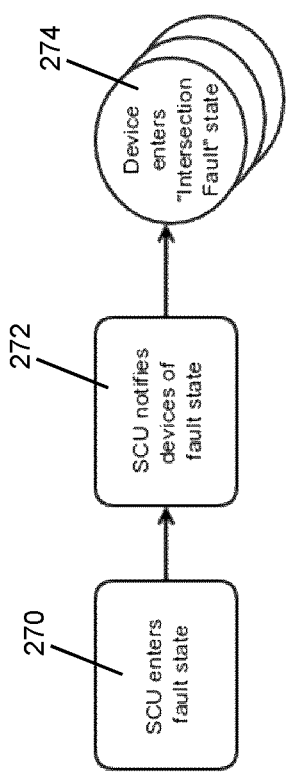
FIG. 10 is a flow diagram for another intersection fault mode.

Flow diagrams outlining failure modes are shown in FIGS. 9 and 10. Referring first to FIG. 9, at 250 a safety critical device is in fault, which then causes the logic to determine if the device is functional at 252. If so, the device changes its state to "local fault" at 254 and that device informs the SCU 52 of the local fault at 256. If the device is not functional, the SCU 52 detects the fault at 260 (e.g. by a failed communication in either direction). At 258 the SCU 52 enters an "intersection fault" state and notifies the safety critical devices and any other devices that are interested in the intersection 10 of the intersection fault at step 262, to ensure that the intersection as a whole enters into an intersection fault mode. Typically this mode includes all signal heads being in a flash state. The notified device(s) then enter the intersection fault state at 264.

As shown in FIG. 10, when the SCU 52 enters a fault state at 270, the SCU 52 notifies the devices of this fault state at 272 and the device then enters an intersection fault state at 274.

Figure 11:
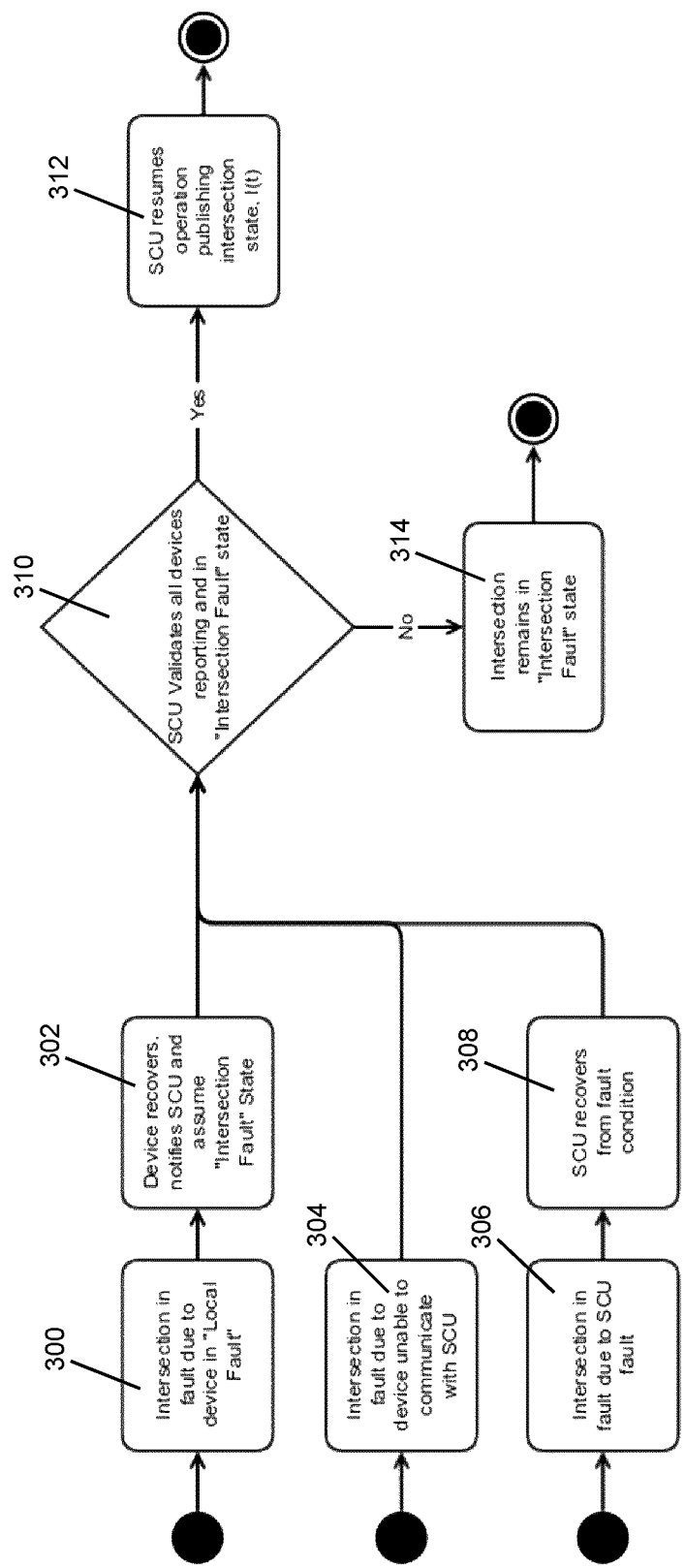
FIG. 11 is a flow diagram for intersection fault mode recovery.

FIG. 11 illustrates a flow diagram for failure mode recovery. In a first scenario at 300, the intersection 10 is in an intersection fault due to a device being in a local fault. The device recovers at 302 and notifies the SCU 52 and assumes the intersection fault state. In a second scenario at 304, the intersection 10 is in an intersection fault due to a device being unable to communicate with the SCU 52. In a third scenario at 306, the intersection 10 is in an intersection fault due to an SCU fault and the SCU 52 recovers from the fault condition at 308. In any or all of these scenarios, the SCU 52 determines at 310 if it can validate all devices reporting to it and are all in a state of intersection fault. If so, the SCU 52 resumes operation publishing the intersection state I(t) at 312. If not, the intersection remains in the intersection fault state at 314.

Figure 12:
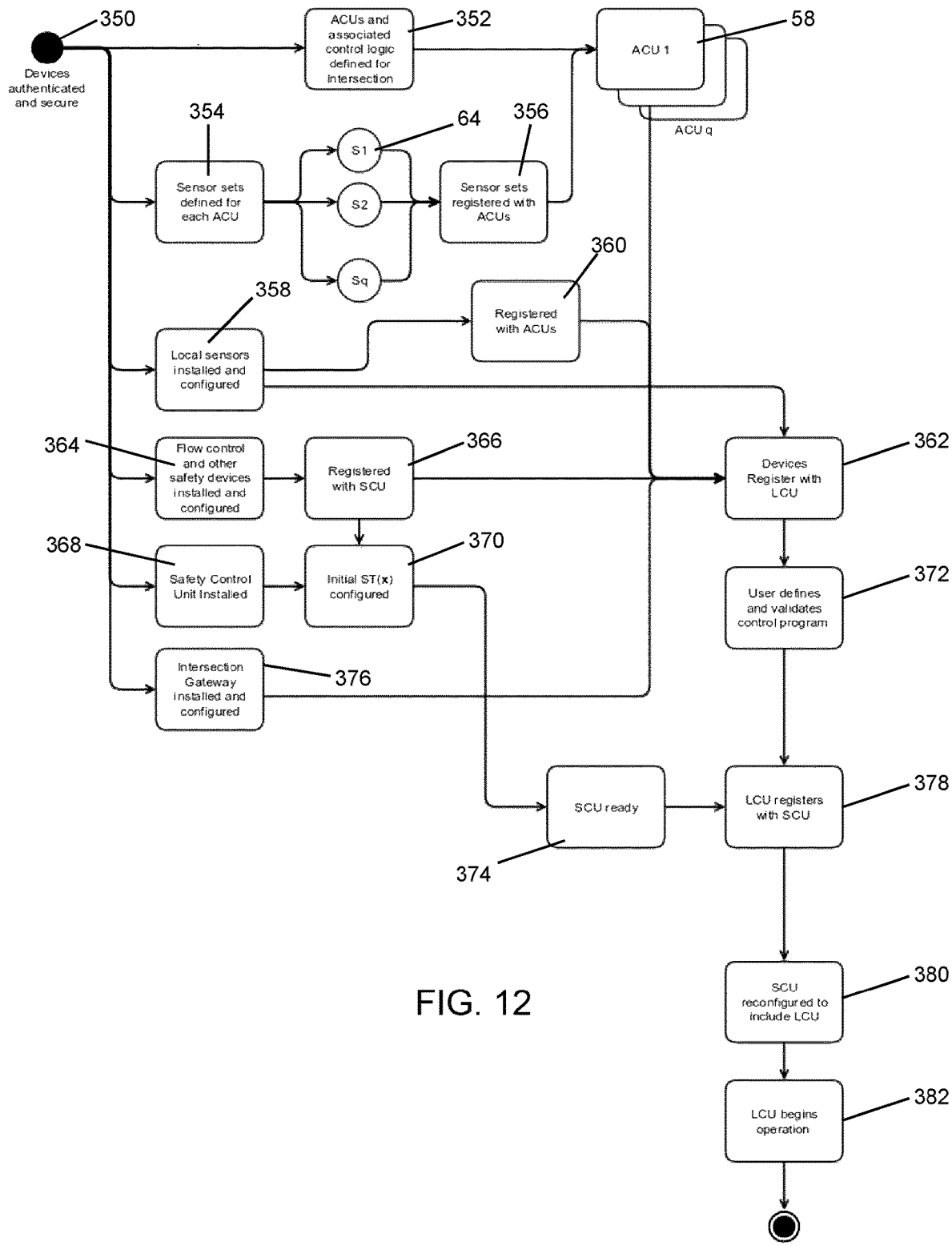
FIG. 12 is a flow diagram for configuration of a local control unit (LCU)

Turning now to FIG. 12, a flow diagram illustrating operations for configuring the LCU 54 are shown. At 350 the secure communication between all devices affecting the intersection has been established. The ACUs 58 and associated control logic are defined for the intersection at 352, and this logic is provided to the ACUs 58. The sensor sets 64 are also defined for each ACU 58 at 354, and the sensor sets 64 are registered with the ACUs 58 at 356. A sensor set 65 can include all of the referenced sensors for an ACU 58 or LCU 54. In a simplified example, consider a corridor including an intersection 10, localized sensors and downstream sensors. An ACU 58 could be defined to request service on behalf of the downstream sensors. In this example, the LCU 54 would have a sensor set 64 referencing the sensors local to the intersection 10, while the ACU 58 would have a sensor set referencing the downstream sensors.

The sensors 64 local to the intersection are installed and configured at 358 and then registered with the ACUs 58 at 360. The flow control and other safety devices are installed and configured at 364, registered with the SCU 52 at 366, and the devices and sensors are registered with the LCU 54 at 362. The SCU 52 is installed at 368 and the initial safety table ST(x) is configured at 370 and the SCU 52 is deemed to be ready at 374. The LCU 54 registers with the SCU 52 once the SCU 52 has indicated that it is in a ready state at 374, and a user defines and validates a control program for deployment at 372. The IG 56 is installed and configured at 376, and is one of the devices registered with the LCU 54 at 362. It can be appreciated that the flow control device configuration, the SCU installation, and the IG installation and configuration may be concurrent or sequential, or partially concurrent and partially sequential.

Once the SCU 52 is ready at 374, the LCU 54 registers with the SCU 52 at 378, and the SCU is reconfigured to include the LCU 54 at 380. The LCU 54 may be considered a safety critical device as a lack of intersection monitoring and control may lead to unsafe utilization of the intersection 10. This behaviour is consistent with the safe operation of traditional intersections. The LCU 54 then begins operation at 382.

The SCU 52 validates all proposed intersection states prior to publication. The validation is performed by evaluating the proposed state in a function denoted by the safety table ST(x). The safety table ST(x) function can be defined in the following manner.

Let a proposed intersection state be represented by $x=\{x_1, x_2, \ldots x_N\}$ for N safety devices in an intersection. Each $x_i$ belongs to $\{0, m_1, m_2, \ldots, m_{n\_i}\}$ with:

$m_j$: a mode of operation of safety device i;
0: device i not reporting or in a local fault condition; and
n_i: number of modes that device i operates in.
Then, the Safety Table is:
ST(x)=0: x is an unsafe configuration; and
1: x is a safe configuration.

Figure 13:
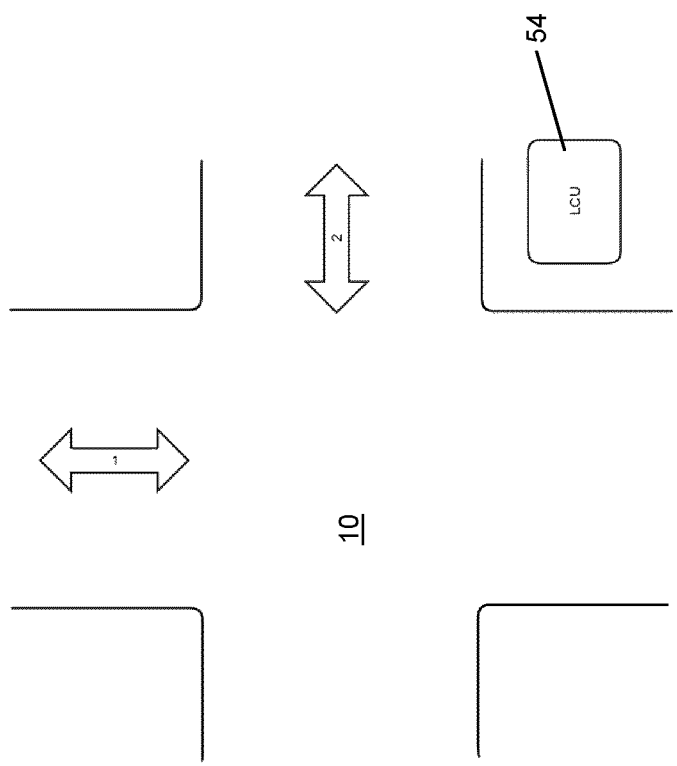
FIG. 13 is a schematic diagram of an example intersection.

Referring now to FIG. 13, a simplified example with an intersection 10 having two movements is shown. The intersection 10 in this example has 3 safety devices: flow control device for movement 1 (ID 1), flow control device for movement 2 (ID 2), and LCU (ID 3). The states of each are:
1: G, Y, R
2: G, Y, R
3: On
With these devices, the ST(x) for this simple system is:

TABLE 1

Example State Table

| $x_1$ | $x_2$ | $x_3$ | ST(x) |
| --- | --- | --- | --- |
| G | G | On | 0 |
| Y | G | On | 0 |

TABLE 1-continued

Example State Table

| $x_1$ | $x_2$ | $x_3$ | ST(x) |
| --- | --- | --- | --- |
| R | G | On | 1 |
| 0 | G | On | 0 |
| G | Y | On | 0 |
| Y | Y | On | 0 |
| R | Y | On | 1 |
| 0 | Y | On | 0 |
| G | R | On | 1 |
| Y | R | On | 1 |
| R | R | On | 1 |
| 0 | R | On | 0 |
| G | 0 | On | 0 |
| Y | 0 | On | 0 |
| R | 0 | On | 0 |
| 0 | 0 | On | 0 |
| G | G | 0 | 0 |
| Y | G | 0 | 0 |
| R | G | 0 | 0 |
| 0 | G | 0 | 0 |
| G | Y | 0 | 0 |
| Y | Y | 0 | 0 |
| R | Y | 0 | 0 |
| 0 | Y | 0 | 0 |
| G | R | 0 | 0 |
| Y | R | 0 | 0 |
| R | R | 0 | 0 |
| 0 | R | 0 | 0 |
| G | 0 | 0 | 0 |
| Y | 0 | 0 | 0 |
| R | 0 | 0 | 0 |
| 0 | 0 | 0 | 0 |

Figure 14:
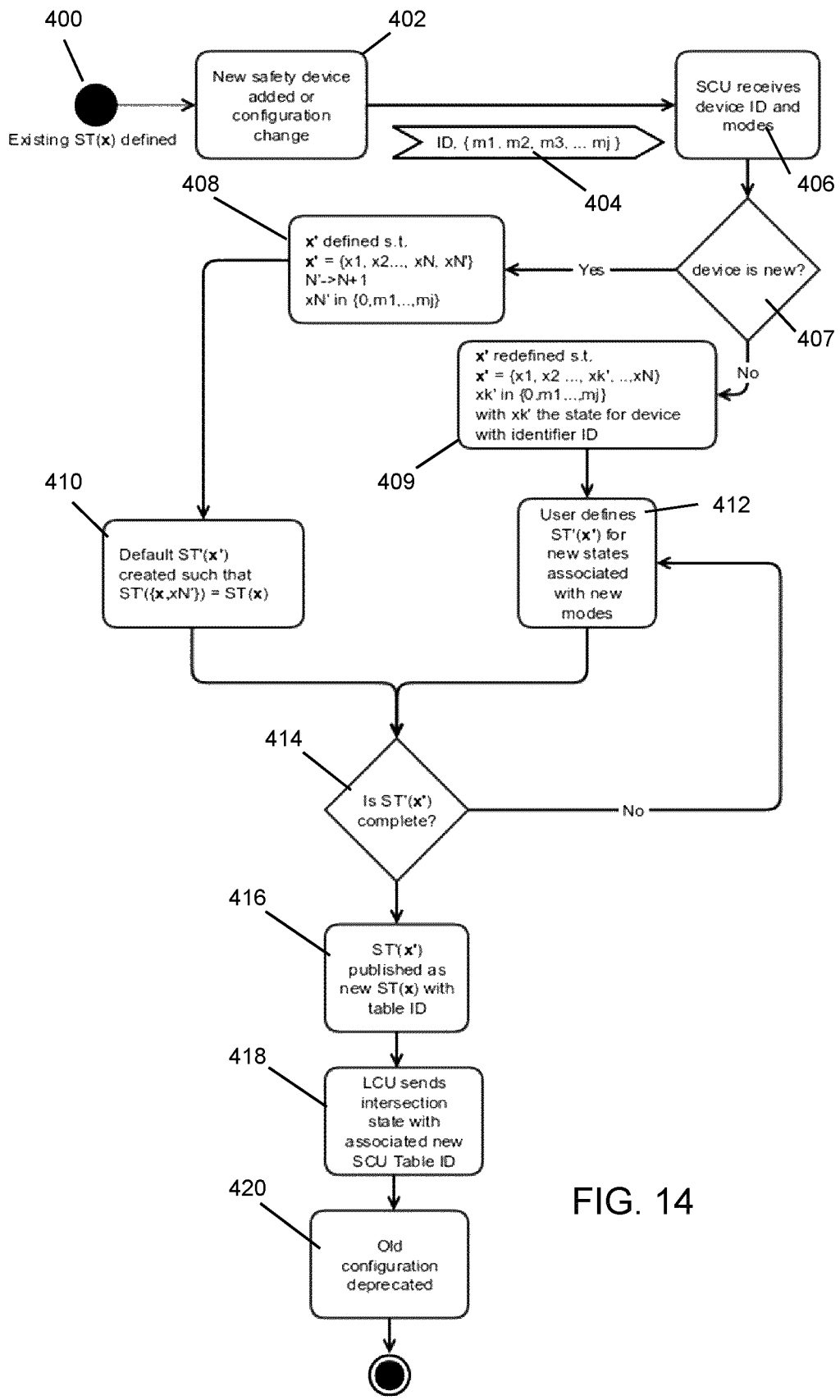
FIG. 14 is a flow diagram for configuration of a safety control unit (SCU).

A flow diagram illustrating the configuration of an SCU 52 with a new or revised safety table ST(x) is shown in FIG. 14. At 400 it is assumed that an existing ST(x) is defined and at 402 a new safety device is added or a configuration changes (e.g., more states, fewer devices, etc.). It should be appreciated that x could initially be an empty vector for an unconfigured intersection. For the safety device being added or configured, the ID and associated modes $m_1, m_2, \ldots, m_{n\_ID}$ are transmitted to the SCU 52 at 404 and received at 406.

The SCU 52 determines at 407 whether the device is a new device or an existing device. For a new device the new state vector x' is constructed by augmenting the existing vector $x=\{x_1, x_2, \ldots, x_N\}$ with one additional field $x_{N'}$ representing the possible modes of the new device at 408. In 410, a default safety table, ST'(x'), is subsequently proposed with the property that the states of the new device are ignored. If at 407 the SCU 52 determines that the device is already known (existing) then a new state vector is defined with the associated field $x_{k'}$ replaced by the new modes {0,m1, ... mj} as shown at 409. In this case a default proposed safety table ST'(x') cannot be automatically generated but must be provided by a user at 412.

Concurrent to the creation of a default proposed safety table ST'(x') at 410, a user may also opt to provide an alternative ST'(x') to the SCU 52. Once all entries in ST'(x') are provided to the SCU 52 at 414, the new safety table is published as the new ST(x) to the LCU with an associated table identifier at 416. In 418, the LCU has received a notification of the new table in use by the SCU and subsequently sends the next intersection state I(t) along with the received safety table identifier to acknowledge the usage of the new table. Upon receipt of the LCU's acknowledgement of the safety table change message in 418, the SCU may begin utilizing the new safety table in 420 and deprecate the old safety table. The steps in 416 to 420 are analogous of a three-way handshake to synchronize and acknowledge the change of the safety table.

In some configurations the network created behind the IG 56 may be partitioned to introduce an additional layer of isolation and security for some components. This may be done to isolate safety critical devices from the rest of the network thus providing an additional layer of security by preventing communication from non-safety critical nodes to safety critical nodes. Security can be achieved in many ways, including for example subnets. In one implementation, such a configuration can include two subnets, the first including everything in the intersection 10, and the second (i.e. a sub-subnet) for only the safety-critical devices. It can be appreciated that more than two subnets could also be used.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the system 50, any component of or related to the system 50, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A digital intersection system comprising digital, addressable, connected components, the components comprising:
   at least one safety-critical device controlling allowable movements into or through an intersection;
   a local control unit configured to generate and output an intersection state change based on inputs comprising information related to the intersection or local area surrounding the intersection, or impacting traffic patterns at an intersection, the intersection state change adjusting the allowable movements of entities within the intersection via operation of the at least one safety critical device;
   a safety control unit configured to:
      accept the intersection state change from the local control unit,
      validate the intersection state change by evaluating the intersection state change with a function based on defined combinations of operational modes of the at least one safety-critical device, to maintain comparable safety to traditional physical malfunction management units (MMUs),
      upon validation, provide the validated intersection state change to at least one device in the intersection, the at least one device in the intersection comprising the at least one safety-critical device; and
   a digital network connecting the components to permit communications therebetween.

2. The system of claim 1, further comprising at least one sensor corresponding to a device or data source capable of collecting the information related to the intersection or local area surrounding the intersection, or impacting traffic patterns at an intersection, wherein the local control unit is further configured to accept the inputs from the at least one sensor.

3. The system of claim 2, wherein the at least one sensor comprises a plurality of sensors, the plurality of sensors comprising at least one sensor at the intersection, and at least one sensor positioned remote to the intersection.

4. The system of claim 1, wherein at least one of the safety-critical device, the local control unit, and the safety control unit comprises a secure module for communicating securely within the system.

5. The system of claim 1, further comprising at least one auxiliary control unit configured to accept inputs from one or more sensor devices and output one or more control instructions to the local control unit.

6. The system of claim 5, wherein at least one auxiliary control unit comprises a local auxiliary control unit or a remote auxiliary control unit.

7. The system of claim 5, wherein the at least one auxiliary control unit comprises a secure module for communicating securely within the system.

8. The system of claim 1, wherein the local control unit receives inputs from one or more sensors, and the safety control unit receives information about the state of the at least one safety-critical device controlling allowable movements into or through the intersection to validate the intersection state change.

9. The system of claim 1, further comprising at least one intersection gateway in communication with the local control unit to permit the local control unit to communicate with a communication network.

10. The system of claim 9, wherein the at least one intersection gateway is configured to enable devices external to the intersection to communicate with devices internal to the intersection.

11. The system of claim 1, wherein the safety control unit is connected to each of a plurality of signal heads used to control traffic at the intersection.

12. The system of claim 11, wherein the safety control unit is connected to an auxiliary control unit deployed in each of the plurality of signal heads.

13. The system of claim 1, wherein the safety control unit is connected to a vehicle-to-infrastructure network for controlling an intersection that does not require signal heads.

14. The system of claim 1, wherein applications running in any one of the components of the system are software driven, controlled, and updated.

15. The system of claim 1, wherein the at least one safety-critical device comprises at least one of a pedestrian detection camera, a signal head, a vehicle detection device, a pedestrian signaler, a railway safety barrier, a rail sensor, an accident detection device, and an infrastructure access point.

16. The system of claim 1, wherein each of the local control unit and the safety control unit is (1) run on a respective container isolated with hardware permissions or (2) a separate device.

17. The system of claim 1, wherein the safety control unit determines whether the at least one safety-critical device is in a fault state based on communication with the at least one safety-critical device.

18. A method for implementing an intersection state change using a digital intersection system comprising digital, addressable, connected components comprising a local control unit and a safety control unit, the method comprising:
  receiving at the local control unit, sensor data from one or more sensors in the intersection, each sensor corresponding to a device or data source collecting information related to an intersection or local area surrounding the intersection, or impacting traffic patterns at the intersection; and
  outputting, by the local control unit, a state change generated based on inputs comprising the sensor data, the state change adjusting the allowable movements of entities within the intersection via operation of at least one safety critical device;
  sending the state change to a safety control unit configured to:
    accept the state change from the local control unit,
    validate the state change by evaluating the state change with a function based on defined combinations of operational modes of the at least one safety-critical device, to maintain comparable safety to traditional physical malfunction management units (MMUs), and
    upon validation, provide the validated state change to at least one device in the intersection, the at least one device comprising the at least one safety-critical device corresponding to a device controlling allowable movements into or through the intersection.

19. The method of claim 18, further comprising:
  providing at least one sensor corresponding to a device or data source capable of collecting the information related to the intersection or local area surrounding the intersection, or impacting traffic patterns at an intersection, wherein the local control unit is further configured to accept the inputs from the at least one sensor.

20. The method of claim 19, wherein the at least one sensor comprises a plurality of sensors, the plurality of sensors comprising at least one sensor at the intersection, and at least one sensor positioned remote to the intersection.

21. The method of claim 18, wherein at least one of the at least one safety-critical device, the local control unit, and the safety control unit comprises a secure module for communicating securely within the system.

22. The method of claim 18, wherein the at least one safety-critical device comprises at least one of a pedestrian detection camera, a signal head, a pedestrian signaler, a railway safety barrier, a rail sensor, an accident detection device, and an infrastructure access point.

23. A non-transitory computer readable media comprising computer executable instructions for implementing an intersection state change using a digital intersection system comprising digital, addressable, connected components comprising a local control unit and a safety control unit, comprising instructions for:
  receiving at the local control unit, sensor data from one or more sensors in the intersection, each sensor corresponding to a device or data source collecting information related to an intersection or local area surrounding the intersection, or impacting traffic patterns at the intersection; and
  outputting, by the local control unit, a state change generated based on inputs comprising the sensor data, the state change adjusting the allowable movements of entities within the intersection via operation of at least one safety critical device;
  sending the state change to a safety control unit configured to:
    accept the state change from the local control unit,
    validate the state change by evaluating the state change with a function based on defined combinations of operational modes of the at least one safety-critical device, to maintain comparable safety to traditional physical malfunction management units (MMUs), and
    upon validation, provide the validated state change to t least one device in the intersection, the at least one device comprising the at least one safety-critical device corresponding to a device controlling allowable movements into or through the intersection.

* * * * *